United States Patent [19]

Ellis

[11] 4,334,114
[45] Jun. 8, 1982

[54] PRODUCTION OF AROMATIC HYDROCARBONS FROM A MIXED FEEDSTOCK OF $C_5$–$C_{12}$ OLEFINS AND $C_3$–$C_4$ HYDROCARBONS

[75] Inventor: John F. G. Ellis, Northwood, England

[73] Assignee: The British Petroleum Company Limited, London, England

[21] Appl. No.: 173,767

[22] Filed: Jul. 30, 1980

[30] Foreign Application Priority Data

Aug. 7, 1979 [GB] United Kingdom ............... 7927534

[51] Int. Cl.³ .............................................. C07C 15/02
[52] U.S. Cl. .................................... 585/407; 208/135; 585/415
[58] Field of Search ................. 585/407, 415; 208/135

[56] References Cited

U.S. PATENT DOCUMENTS

| | | | |
|---|---|---|---|
| 3,894,104 | 7/1975 | Chang et al. ................... | 208/135 X |
| 4,056,575 | 11/1977 | Gregory et al. ................ | 208/135 X |
| 4,090,949 | 5/1978 | Owen et al. .................... | 208/78 |
| 4,112,011 | 9/1978 | Kolombos ....................... | 585/415 |
| 4,162,212 | 7/1979 | Miller ............................. | 208/79 |
| 4,169,865 | 10/1979 | Bamforth et al. ............... | 585/314 |
| 4,180,689 | 12/1979 | Davies et al. ................... | 585/407 |
| 4,190,519 | 2/1980 | Miller et al. ................... | 208/79 |

Primary Examiner—Delbert E. Gantz
Assistant Examiner—G. E. Schmitkons
Attorney, Agent, or Firm—Brooks, Haidt, Haffner & Delahunty

[57] ABSTRACT

This invention relates to a process for producing aromatic hydrocarbons suitable for use as gasoline blending components. In the process a mixed hydrocarbon feedstock comprising a $C_5$–$C_{12}$ hydrocarbon fraction containing olefins and an (un)saturated $C_3$–$C_4$ hydrocarbon is brought into contact in the vapor phase with an aluminosilicate having a gallium compound deposited thereon or having gallium ions exchanged with cations therein. The resultant product shows considerable improvement in RON and MON and is therefore ideal for blending with gasoline. Hydrogen is formed as a valuable by-product.

7 Claims, No Drawings

PRODUCTION OF AROMATIC HYDROCARBONS FROM A MIXED FEEDSTOCK OF $C_5$–$C_{12}$ OLEFINS AND $C_3$–$C_4$ HYDROCARBONS

The present invention relates to a process for the production of aromatic hydrocarbons from olefins and in particular to the production of highly aromatic gasoline blending components and hydrogen from olefin-containing petroleum fractions.

In some conventional processes for the refining of petroleum, various hydrocarbon fractions are obtained which boil in the motor gasoline boiling range (15° to 205° C.) which are to varying degrees unsuitable for use directly as motor gasolines. For instance fractions produced from cracking operations contain significant proportions of olefins, which adversely affect the motor octane value (MON) of the gasoline. Examples of fractions of this sort include the light and heavy catalytically cracked spirits obtained by the catalytic cracking of heavy distillate oils of boiling range 350° C. to 550° C., and thermally cracked and steam cracked gasoline fractions. These fractions can be used as gasoline blending components but it is preferable to improve their quality to achieve optimum blending performance. Fractions of this type, in particular the light catalytically cracked spirits, have an undesirably low motor octane number (MON) in relation to the research octane number (RON) and this is partly due to the presence of high concentrations of olefins.

Hitherto the improvement of the gasoline blending values of olefinic fractions of this type has been achieved by the addition of compounds such as tetra alkyl lead. In addition, U.S. Pat. No. 4,090,949 discloses a method of upgrading relatively poor quality olefinic gasoline, for example, by conversion thereof in the presence of hydrogen and/or carbon hydrogen contributing fragments and an acid function catalyst comprising a crystalline zeolite of selected pore characteristics. The hydrogen contributor in this case is preferably a $C_5$ or less carbon atom material and may be selected from the group comprising olefinic gases, alcohols and ethers. The preferred hydrogen contributing agents are said to be methanol and $C_2$–$C_5$ olefins.

It has now been found that by mixing olefinic gasoline fractions with saturated or unsaturated $C_3$–$C_4$ hydrocarbons and bringing the mixed feedstock into contact with a specific catalyst composition, it is possible to produce a product rich in aromatic hydrocarbons which can be used either as a high grade gasoline blending component or as a petrochemical feedstock, while at the same time producing hydrogen as a valuable co-product.

Accordingly the present invention is a process for converting olefins to aromatic hydrocarbons and hydrogen, which comprises bringing a mixed feedstock comprising (a) a hydrocarbon fraction containing olefins and consisting substantially of $C_5$ to $C_{12}$ hydrocarbons and (b) saturated and/or unsaturated $C_3$–$C_4$ hydrocarbons into contact in the vapour phase at an elevated temperature with a catalyst composition comprising an alumino silicate having a gallium compound deposited thereon and/or an alumino silicate in which cations have been exchanged with gallium ions, said alumino silicate having a silica to alumina ratio of at least 5:1.

The hydrocarbon fractions containing olefins which are suitable for use in the process of the present invention include those containing at least 5% by weight, and preferably from 15% to 75% by weight, of olefins. Hydrocarbon fractions containing even higher concentrations of olefins can also be used. A suitable source of the olefinic hydrocarbon fraction is the full range of cracked spirits from the catalytic, thermal or steam cracking of light or heavy distillate oils. In particular, atmospheric or vacuum residue, or deasphalted oils are suitably the feeds to the thermal cracking or residue catalytic cracking processes either before or after hydrotreatment. Olefinic hydrocarbon fractions forming the full product spectrum from catalytic cracking or heavy oils (b.p $C_5$ to 200° C.) either as such or separated into light cat cracked spirit and heavy cat cracked spirits are preferred.

The saturated and/or unsaturated $C_3$–$C_4$ hydrocarbons in the feedstock may be any stream which contains these hydrocarbons in major proportions. A particularly suitable source of these hydrocarbons accompanied by small amounts of $C_1/C_2$ hydrocarbons is e.g. by-product gases from thermal, catalytic or steam cracking of wax distillates, residues and deasphalted oils either before or after hydrotreating. The source of $C_3$ and $C_4$ hydrocarbons maybe liquified petroleum gas found in nature or derived from straight run distillation or from catalytic reforming and hydrocracking processes.

The relative proportions of the olefinic hydrocarbon fraction and the $C_3$–$C_4$ hydrocarbons in the mixed feedstock is suitably between 1:3 and 3:1.

The gallium in the catalyst composition may be present as gallium oxide and/or as gallium ions if cations in the aluminosilicate support have been exchanged with gallium ions. In the case where the cations in the aluminosilicate have been exchanged for gallium ions, the gallium ion is suitably provided as an aqueous solution of a gallium salt such as for instance gallium nitrate, gallium chloride or gallium sulphate. Such catalysts may be produced by conventional ion exchange techniques and the catalysts so produced are subsequently dried. For example an aqueous solution of a gallium compound such as gallium nitrate may be placed in contact with the aluminosilicate at ambient or elevated temperature, e.g. by refluxing. The exchanged aluminosilicate is then separated by decantation followed by filtration, washed several times with deionised water and finally dried. Before addition to the aqueous solution of the gallium compound, the aluminosilicate may be acid treated.

The aluminosilicates which have gallium ions deposited thereon and/or in which an exchange with gallium ions may be carried out suitably have a silica to alumina ratio of between 20:1 and 200:1 and may be selected from zeolite-$\beta$ and zeolites of the general formula $M_{2/n}O.Al_2O_3.ySiO_2zH_2O$ wherein M is a cation which is a positively charged ion selected from a metal ion, an organic ion and a proton of galence n, y is an integer greater than 5 and z is from 0 to 40. The metal cation, M, is preferably an alkali metal or alkaline earth metal ion, preferably sodium or potassium ions. The organic cations may suitably be presented by the formula $R^1R^2R^3R^4N+$ or by an ion derived from the diamine $R^1R^2N(CH_2)_xNR^3R^4$ or pyrrolidine where $R^1R^2R^3$ and $R^4$ may be H, $CH_3$, $C_2H_5$, $C_3H_7$, $C_4H_9$ or —$CH_2$-$H_2OH$ and x equals 2, 3, 4, 5 or 6. The ZSM variety of zeolites, for example ZSM-5, ZSM-8, ZSM-11, ZSM-12 and ZSM-35 are particularly preferred and these are extensively described in a number of publications including our European patent application Nos: 0002899 and 0002900. The present invention may also be carried out using catalysts in which the gallium deposited is impregnated on the surface of the aluminosilicate or is incorporated in the intracrystalline zeolite cavities as a gallium compound which gives rise to gallium oxide during activation of the catalyst prior to contact with the hydrocarbon feedstock. An example of a suitable gallium compound is gallium nitrate. Conventional impregnation techniques may be used to produce these catalysts.

The impregnation may be achieved by preparing a solution, suitably an aqueous solution, of a gallium compound such as for example gallium nitrate and adding a conventional aluminosilicate to this aqueous solution with thorough stirring to form a paste. The paste is subsequently dried at an elevated temperature in vacuum.

Where the catalyst composition is prepared by using a compound of gallium which ionises in aqueous solution, for example gallium nitrate, it is inevitable that some of the gallium ions will be exchanged with the cations in the aluminosilicate even if the preparation was directed to impregnation of the aluminosilicate.

Whichever method of catalyst preparation is used, the amount of gallium present in the catalyst compositions may vary for instance between 0.05 and 10% by weight of the total aluminosilicate in the catalyst composition. The gallium exchanged or impregnated zeolite thus obtained may be combined with a porous matrix, eg silica or alumina or other inorganic compositions to improve the mechanical strength of the catalyst.

The catalyst composition is suitably activated prior to contact with the hydrocarbon feedstock. The activation may be carried out by heating the catalyst at a temperature of between 400° C. and 650° C., preferably between 500° and 600° C. Activation may be carried out in an atmosphere of hydrogen, air or a gas inert under the reaction conditions such as nitrogen, but most preferably in an atmosphere containing oxygen. The activation may be carried out in the reactor itself prior to the reaction. The catalyst composition is suitably used as a fixed bed.

The mixed hydrocarbon feedstock is thereafter contacted in the vapour phase with the catalyst composition at a temperature between 300° C. and 700° C. preferably between 400° C. and 600° C. suitably in an inert atmosphere in the absence of oxygen. The inert atmosphere may be provided by a gas inert under the reaction conditions such as nitrogen. The products of the reaction are then isolated by distillation.

The principal advantages of the present invention are:
(a) the production of highly aromatic products useful as a gasoline blending component or as a petrochemical feedstock
(b) the improvement of the RON and particularly the MON, whilst reducing the olefin content of the olefinic hydrocarbon fraction for use as gasoline blending components and
(c) the generation of hydrogen as a useful co-product.

The invention is further illustrated with reference to the following Examples.

EXAMPLES 1-4

The catalyst used in these Examples was obtained by ion-exchanging a high silica zeolite having a silica to alumina ratio of 40:1, prepared in its hydrogen form, with gallium nitrate solution (0.05 g. Ga/ml). The dry product was mixed with a silica binder, dried and sieved to 12 to 30 BSS mesh. The resulting catalyst contained 1.6% by weight of gallium and 29% by weight of the silica binder. 200 ml. of this catalyst was charged to a fixed bed reactor and air was passed over the bed at 550° C. for 2-3 hours. Thereafter, the reactor was flushed with nitrogen for 0.5 hr to remove any traces of air. The respective hydrocarbon feedstocks were then mixed, the mixture preheated to the respective reaction temperature and then passed over the catalyst bed. The various hydrocarbon fractions containing olefins used in the Examples were: light catalytically cracked spirit (LCCS) which had a boiling point range (10% to 90%) of 24.6° C. to 125° C. (Examples 1 and 2); full range catalytically cracked spirit (CCS) which had a boiling point range (10% to 90%) of 39.5° C. to 190° C. (Example 3); and the heavy catalytically cracked spirit (HCCS) which had a boiling point range (10% to 90%) of 106° C. to 204° C. (Example 4). The saturated and/or unsaturated $C_3$-$C_4$ hydrocarbons used in each Example was liquified petroleum gas (LPG) which consisted by weight of 7.7% propane, 32.8% propene, 29.2% butanes and 30.3% butenes. The reaction conditions used and the results achieved with each mixed feedstock is shown in Table 1 below. In this Table 1, references to R+O values mean the average of RON and MON values.

TABLE 1

| | Example | | | |
|---|---|---|---|---|
| | 1 | 2 | 3 | 4 |
| Cracked Spirit | LCCS | LCCS | CCS | HCCS |
| RON | 93.2 | 93.2 | 89.6 | 90.3 |
| MON | 80.8 | 80.8 | 78.7 | 77.7 |
| R + O (raw) | 87 | 87 | 84.2 | 84 |
| Bromine No. | 108 | 108 | Not Determined | 39.3 |
| Feed Cracked Spirit (% weight) | 59.0 | 58.1 | 60.8 | 59.4 |
| LPG (% weight) | 41.0 | 41.9 | 39.2 | 40.6 |
| Reaction Temperature °C. | 454 | 524 | 493 | 557 |
| Reaction Pressure (bar abs) | 7 | 7 | 7 | 7 |
| LHSV (volume total feed/ Vol. catalyst/h) | 4.1 | 4.0 | 4.0 | 3.9 |
| Yield of $C_5$ + (% weight on total feed) | 60.5 | 55.6 | 63.9 | 69.8 |
| RON | 100.8 | 108.1 | 100.5 | 104.1 |
| MON | 90.1 | 97.1 | 88.3 | 92.6 |
| R + O (product) | 95.5 | 102.6 | 94.4 | 98.4 |
| Bromine No. | 10.3 | 13.5 | Not Determined | 7.9 |
| Yield of Hydrogen (% weight on total feed) | 1.05 | 1.58 | 0.77 | 1.50 |
| Improvement in R + O Values | 8.5 | 15.6 | 10.2 | 14.4 |

The results now achieved were compared with the following results obtained by the fluid catalytic cracking (FCC) process described in the Examples of U.S. Pat. No. 4,090,949:

TABLE 2

| Example No. | Feedstock | R + O Values | | Improvement in R + O Values |
|---|---|---|---|---|
| | | Raw Feedstock | Treated Product | |
| 1 | FCC Gasoline | 85.7 | 92.5 | 6.8 |
| 2 | FCC Gasoline | 85.7 | 89.8 | 4.1 |

I claim:
1. A process for converting olefins to aromatic hydrocarbons and hydrogen which comprises bringing a mixed feedstock comprising:

(a) a hydrocarbon fraction containing olefins and consisting substantially of $C_5$ to $C_{12}$ hydrocarbons derived from cracked spirits from the catalytic, thermal, or steam cracking of a crude oil fraction selected from the group consisting of distillate oils, light heavy distillate oils, atmospheric residue and vacuum residue; and (b) saturated and/or unsaturated $C_3$–$C_4$ hydrocarbons derived from by-product gases from thermal, catalytic, or steam cracking of wax distillates, residues and deasphalted oils either before or after hydrotreating in which the relative proportions of the hydrocarbon fraction containing olefins (a) and the $C_3$–$C_4$ hydrocarbons (b) in the mixed feedstock is between 1:3 and 3:1 by volume into contact in the vapor phase and at an elevated temperature with a catalyst composition comprising an aluminosilicate having a gallium compound deposited thereon and/or an aluminosilicate in which the cations have been exchanged with gallium ions, said aluminosilicate having a silica to alumina ratio of at least 5:1.

2. A process according to claim 1 wherein the hydrocarbon fraction contains from 15 to 75% by weight of olefins.

3. A process according to claim 1 wherein the aluminosilicate has a silica to alumina ratio of between 20:1 and 200:1.

4. A process according to claim 1 wherein the amount of gallium present in the catalyst composition is between 0.05 and 10% by weight of the total aluminosilicate present therein.

5. A process according to claim 1 wherein the catalyst is activated prior to contact with the mixed feedstock in an oxidising or reducing atmosphere at an elevated temperature.

6. A process according to claim 5 wherein the activation is carried out in an oxygen or hydrogen atmosphere.

7. A process according to claim 1 wherein the mixed hydrocarbon feedstock is contacted in the vapour phase with the catalyst composition at a temperature between 300° and 700° C.

* * * * *